(12) United States Patent
Liang

(10) Patent No.: US 10,078,352 B2
(45) Date of Patent: Sep. 18, 2018

(54) PORTABLE ELECTRONIC DEVICE AND PIVOTING MECHANISM THEREOF

(71) Applicant: WISTRON CORP., New Taipei (TW)

(72) Inventor: Chen-Yi Liang, New Taipei (TW)

(73) Assignee: WISTRON CORP., New Taipei (TW)

( * ) Notice: Subject to any disclaimer, the term of this patent is extended or adjusted under 35 U.S.C. 154(b) by 51 days.

(21) Appl. No.: 15/346,660

(22) Filed: Nov. 8, 2016

(65) Prior Publication Data

US 2017/0371379 A1 Dec. 28, 2017

(30) Foreign Application Priority Data

Jun. 22, 2016 (TW) .............................. 105119639 A

(51) Int. Cl.
*E05C 17/64* (2006.01)
*G06F 1/16* (2006.01)
*F16C 11/04* (2006.01)
*F16M 13/00* (2006.01)

(52) U.S. Cl.
CPC ............ *G06F 1/1681* (2013.01); *E05C 17/64* (2013.01); *F16C 11/04* (2013.01); *F16M 13/005* (2013.01); *G06F 1/166* (2013.01); *G06F 1/1618* (2013.01); *G06F 1/1626* (2013.01)

(58) Field of Classification Search
CPC ...... E05C 17/64; G06F 1/1618; G06F 1/1626; G06F 1/166; G06F 1/1681; E05D 11/06
USPC .......................................... 16/342, 343, 345
See application file for complete search history.

(56) References Cited

U.S. PATENT DOCUMENTS

| 6,802,107 | B2 | 10/2004 | Pan | |
| 7,222,396 | B2 * | 5/2007 | Lu | E05D 11/087 16/330 |
| 7,386,918 | B2 * | 6/2008 | Tomizawa | G06F 1/1616 16/303 |
| 7,513,011 | B2 * | 4/2009 | Lu | G06F 1/1601 16/337 |
| 7,631,397 | B2 * | 12/2009 | Yin | G06F 1/1616 16/303 |
| 7,743,465 | B2 * | 6/2010 | Lin | E05F 3/20 16/303 |

(Continued)

FOREIGN PATENT DOCUMENTS

CN 101338785 B 12/2010

OTHER PUBLICATIONS

TW Office Action dated Jul. 25, 2017 as received in Application No. 105119639 [English Translation].

*Primary Examiner* — Roberta S Delisle
(74) *Attorney, Agent, or Firm* — Maschoff Brenan

(57) ABSTRACT

A pivoting mechanism for an electronic device includes a pivot shaft, a first connecting member disposed on the pivot shaft for being connected with a support of the electronic device, a second connecting member disposed on the pivot shaft for connected with a main body of the electronic device, and a torque adjusting assembly. The torque adjusting assembly includes four sleeves and an elastic member through which the pivot shaft is disposed. Each of the sleeves includes at least one protrusion. The protrusion of one of the four sleeves is slidable relative to the protrusion of another sleeve for adjusting an amount of deformation of the elastic member. A portable electronic device including a main body, a support and the pivoting mechanism is provided.

16 Claims, 12 Drawing Sheets

(56) References Cited

U.S. PATENT DOCUMENTS

| | | | | |
|---|---|---|---|---|
| 8,082,626 | B2* | 12/2011 | Chiang | E05F 1/08 16/297 |
| 8,549,709 | B2* | 10/2013 | Luo | G06F 1/1681 16/303 |
| 8,776,319 | B1* | 7/2014 | Chang | G06F 1/1681 16/303 |
| 2005/0044663 | A1* | 3/2005 | Wu | G06F 1/1616 16/280 |
| 2009/0007379 | A1 | 1/2009 | Zhang et al. | |
| 2009/0320243 | A1* | 12/2009 | Wang | G06F 1/1616 16/303 |
| 2009/0320245 | A1* | 12/2009 | Wang | G06F 1/1616 16/374 |

* cited by examiner

US 10,078,352 B2

PORTABLE ELECTRONIC DEVICE AND PIVOTING MECHANISM THEREOF

CROSS-REFERENCE TO RELATED APPLICATIONS

This non-provisional application claims priority under 35 U.S.C. § 119(a) on Patent Application No(s). 105119639 filed in Taiwan R.O.C. on Jun. 22, 2016, the entire contents of which are hereby incorporated by reference.

TECHNICAL FIELD

The present disclosure provides an electronic device and a pivoting mechanism thereof, more particular to a portable electronic device and a pivoting mechanism of the portable electronic device.

BACKGROUND

With the development of technology, the popularity of personal computers has been increasing. Specially, compact, thin and light weight personal computers, such as laptop computers, tablet computers and all-in-one PCs, have become more popular in recent years.

For users to watch videos or view photos on such electronic devices more conveniently, the electronic device is usually equipped with a conventional support (stand). The support can hold the electronic device on the table with a proper inclination such that allows the users to comfortably view the electronic device without holding it.

SUMMARY

According to the disclosure, a pivoting mechanism is adapted for an electronic device including a main body and a support. The pivoting mechanism includes a pivot shaft, a first connecting member, a second connecting member and a torque adjusting assembly. The first connecting member is disposed on the pivot shaft for being connected with the support. The second connecting member is disposed on the pivot shaft for being connected with the main body. The torque adjusting assembly includes a first sleeve, a second sleeve, a third sleeve, a fourth sleeve and an elastic member through which the pivot shaft is disposed. The first sleeve includes at least one first protrusion, the second sleeve includes at least one second protrusion, the third sleeve includes at least one third protrusion, and the fourth sleeve includes at least one fourth protrusion. The at least one first protrusion is slidable relative to the at least one second protrusion and the at least one third protrusion is slidable relative to the at least one fourth protrusion, for adjusting an amount of deformation of the elastic member.

According to the disclosure, a portable electronic device includes a main body, a support and at least one pivoting mechanism mentioned above. The pivoting mechanism connects the main body with the support such that the main body and the support are rotatable relative to each other.

BRIEF DESCRIPTION OF THE DRAWINGS

The present disclosure will become more understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
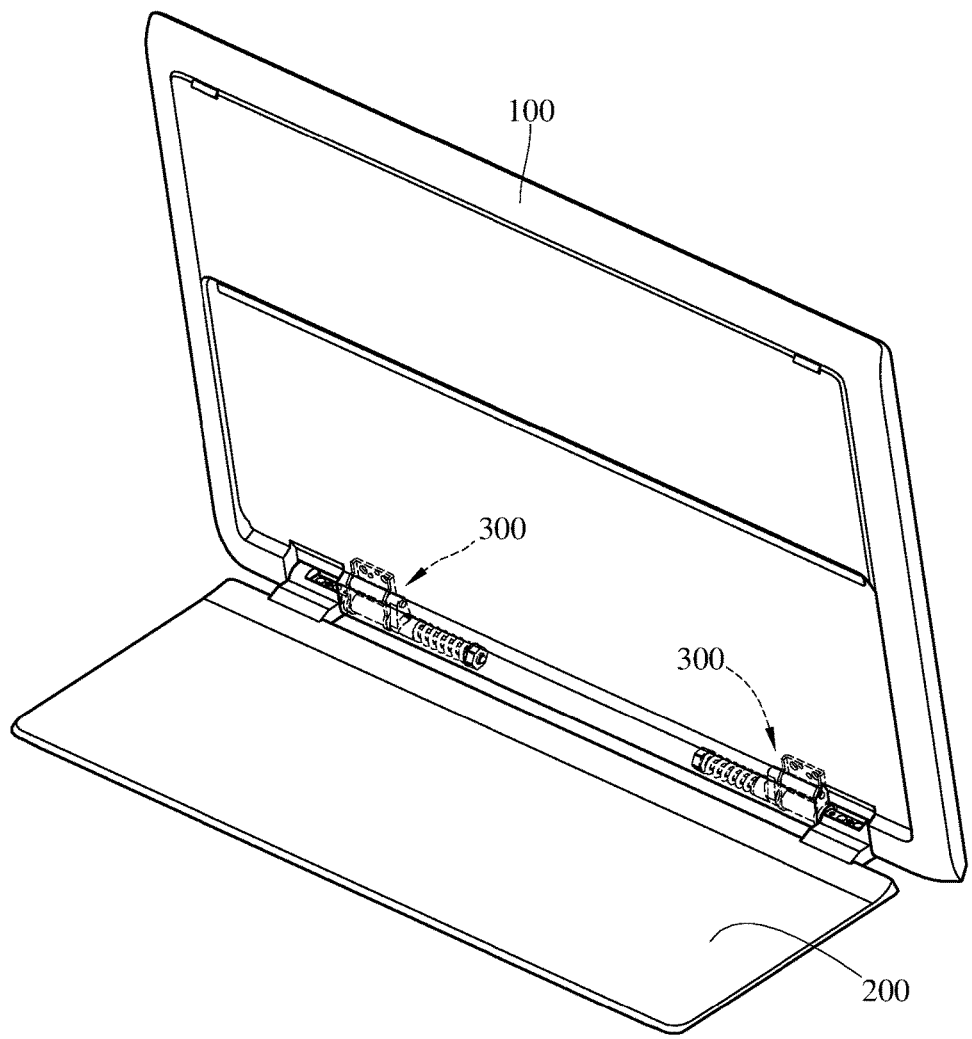
FIG. 1 is a perspective view of a portable electronic device according to a first embodiment.
Figure 2:
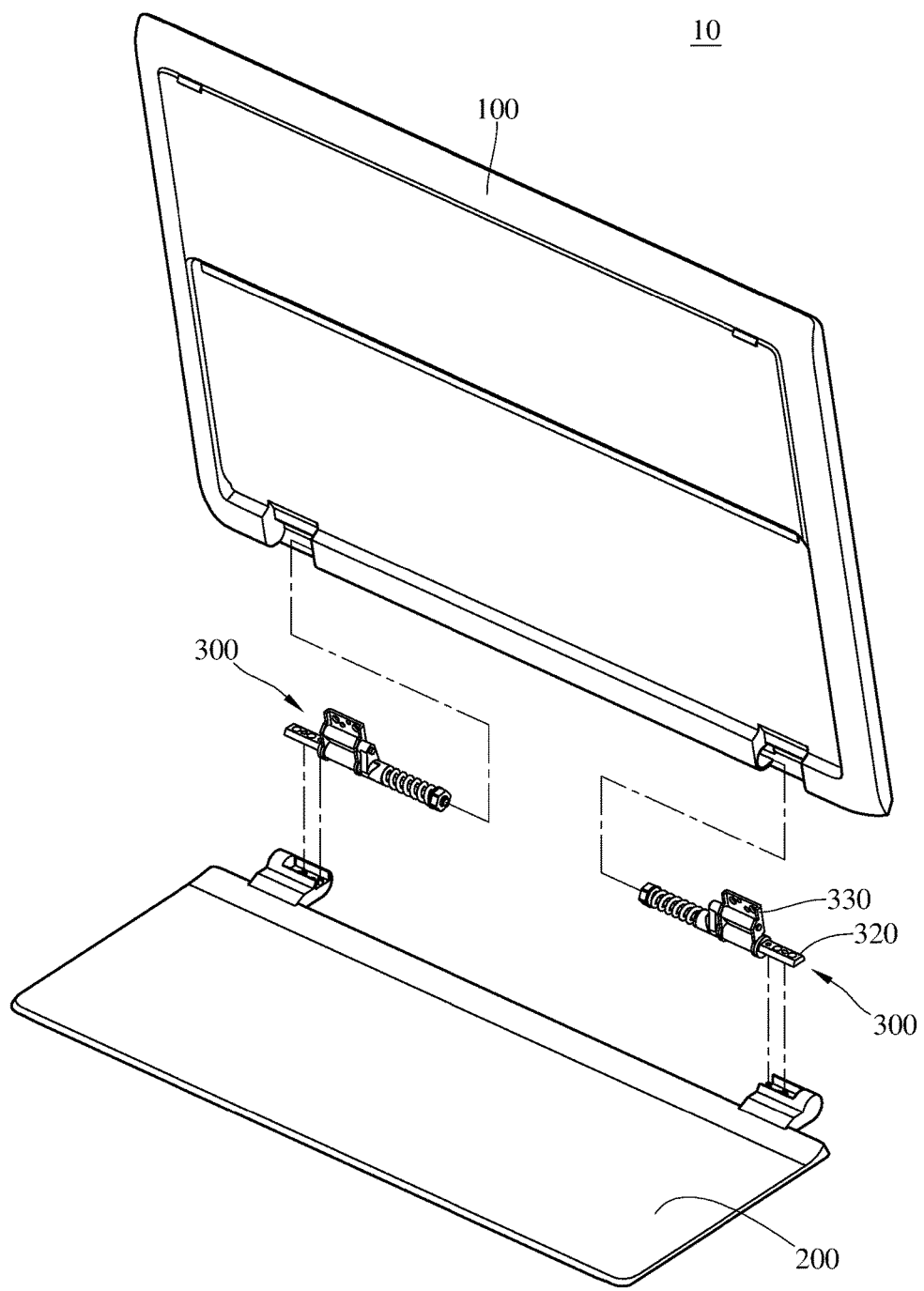
FIG. 2 is an exploded view of the portable electronic device in FIG. 1.

Please refer to FIG. 1 and FIG. 2. FIG. 1 is a perspective view of a portable electronic device according to a first embodiment. FIG. 2 is an exploded view of the portable electronic device in FIG. 1. In this embodiment, a portable electronic device 10 is provided and includes a main body 100, a support 200 and two pivoting mechanisms 300.

The main body 100, for example, can be a host of a tablet including a display, buttons, a battery, a CPU and other required electrical components.

The support 200 is, for example, a plate-shaped support or a bar-shaped support. In this or other embodiments, the support can be a keyboard or a battery holder.

The two pivoting mechanisms 300 are disposed on a side of the main body 100, and each of the pivoting mechanisms 300 connects the main body 100 with the support 200. Thus, the support 200 is rotatable relative to the main body 100 so that an angle between the main body 100 and the support 200 can be adjusted.

Figure 3:
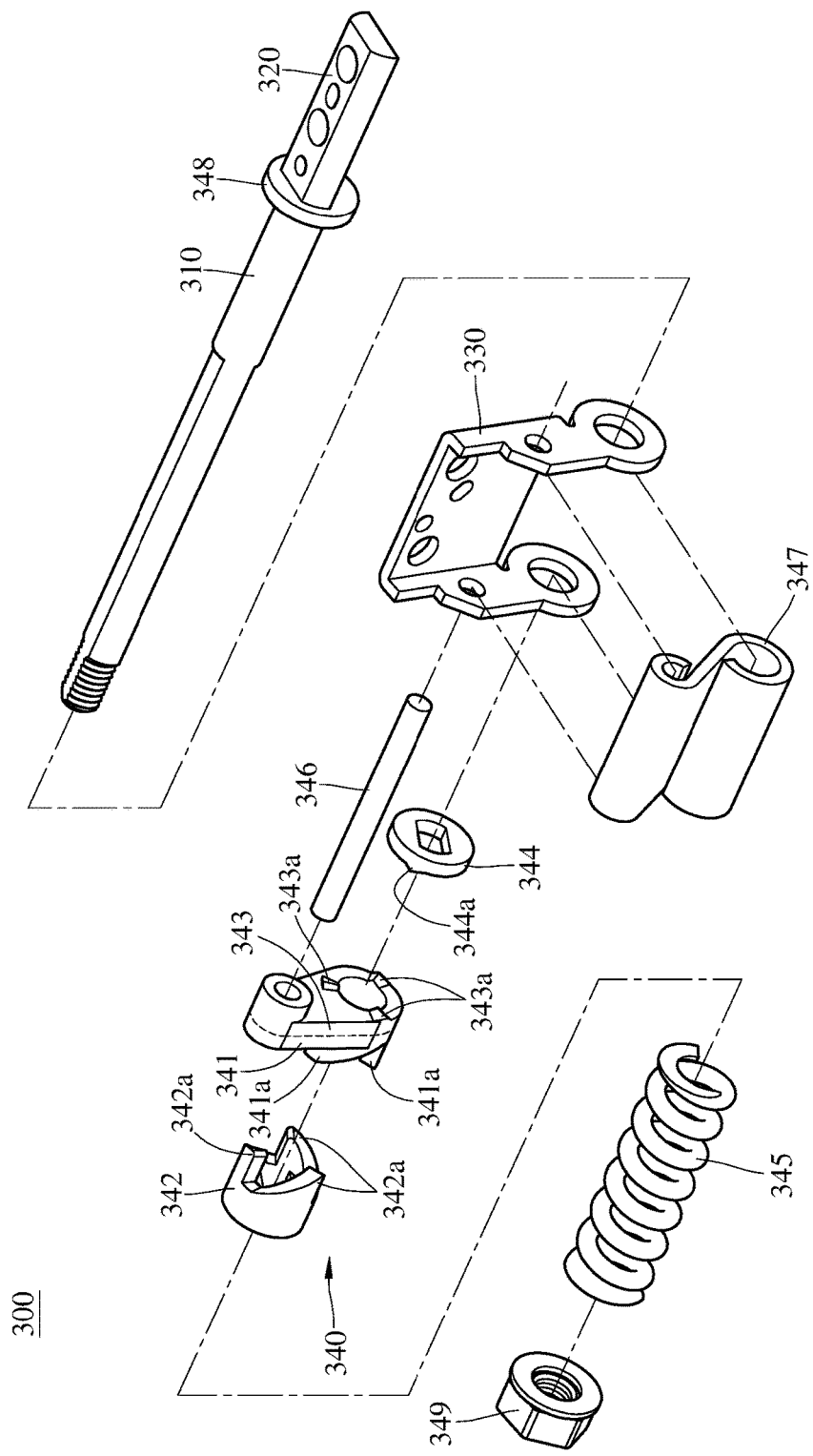
FIG. 3 is an exploded view of a pivoting mechanism of the portable electronic device in FIG. 2.
Figure 4:
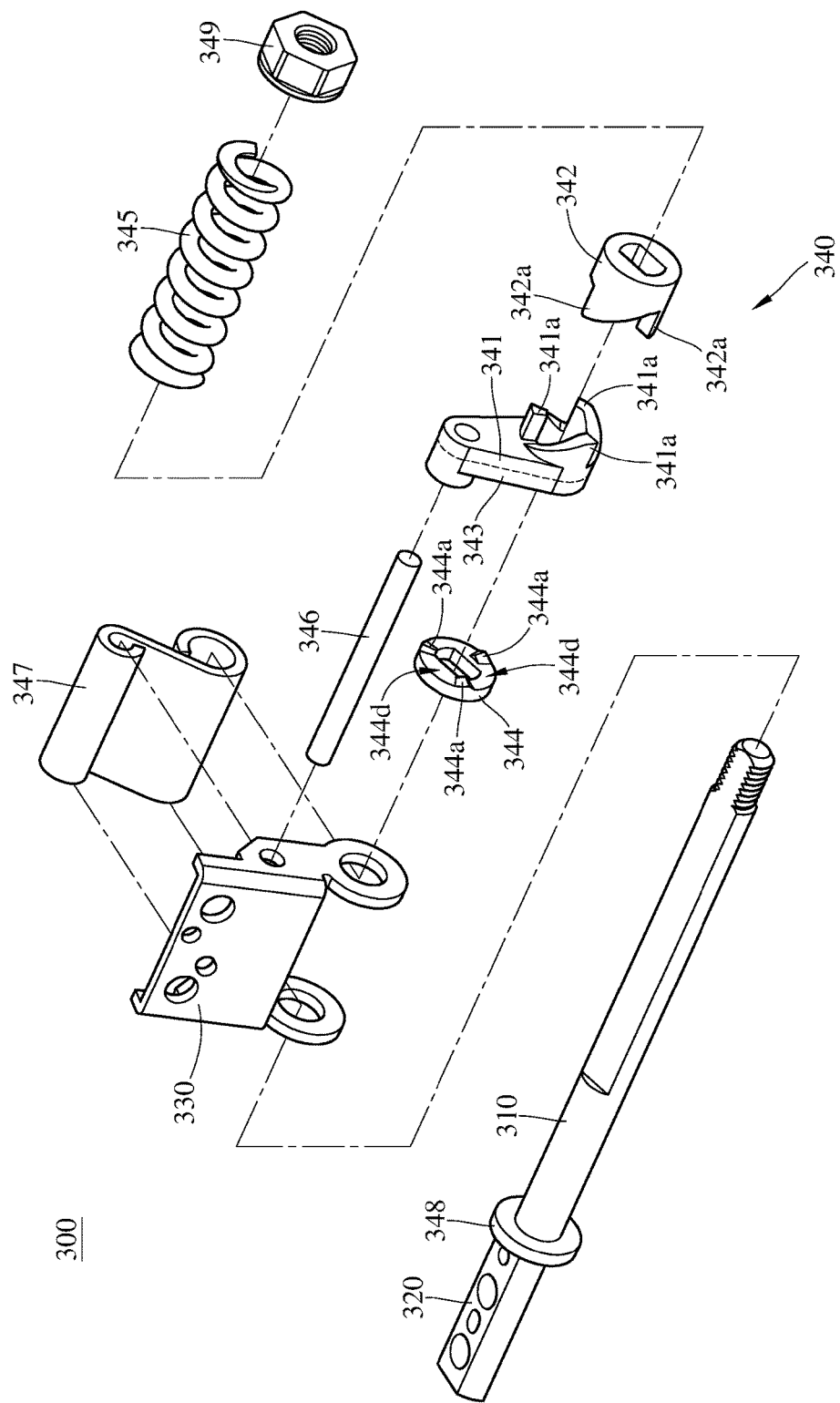
FIG. 4 is another exploded view of the pivoting mechanism in FIG. 2.
Figure 5:
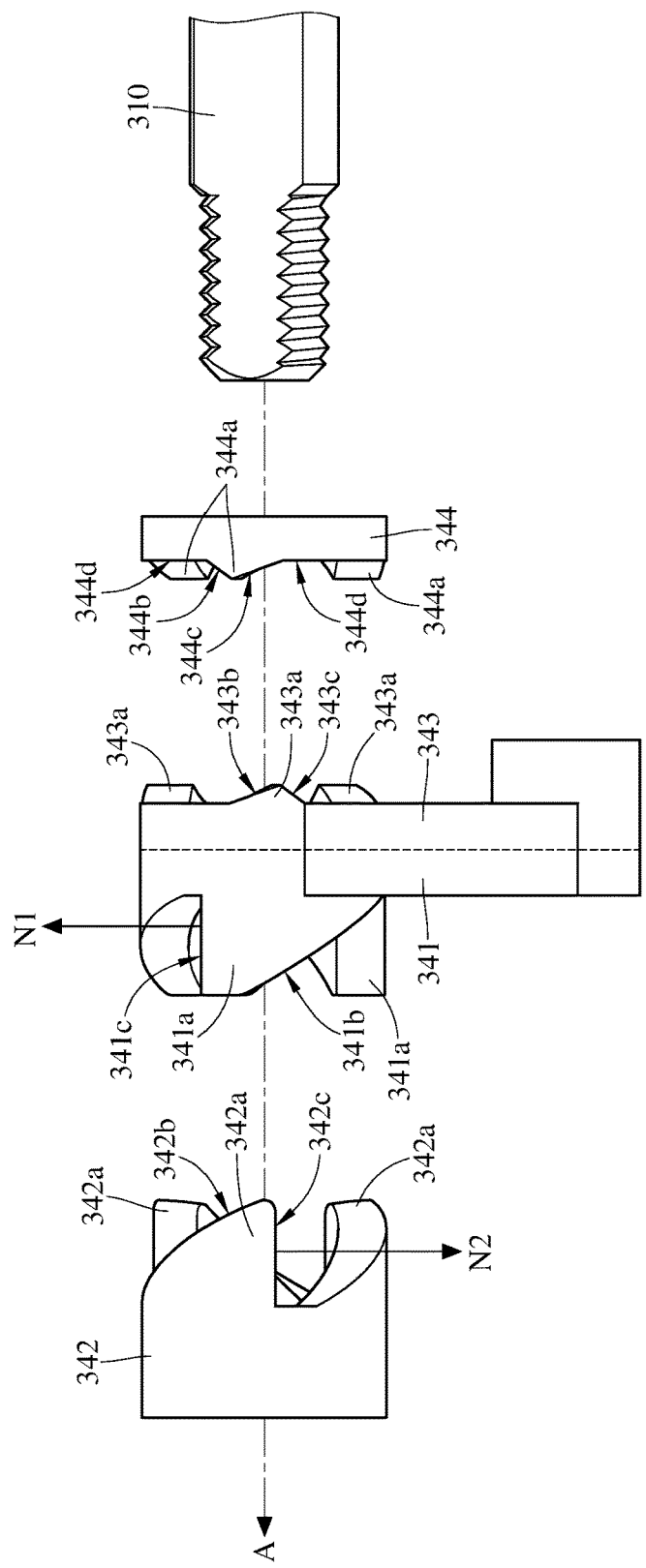
FIG. 5 is a side view of a pivot shaft, a first sleeve, a second sleeve, a third sleeve and a fourth sleeve in FIG. 3.

Please refer to FIG. 3 to FIG. 5. FIG. 3 is an exploded view of a pivoting mechanism of the portable electronic device in FIG. 2. FIG. 4 is another exploded view of the pivoting mechanism in FIG. 2. FIG. 5 is a side view of a pivot shaft, a first sleeve, a second sleeve, a third sleeve and a fourth sleeve in FIG. 3.

Each of the pivoting mechanisms 300 includes a pivot shaft 310, a first connecting member 320, a second connecting member 330 and a torque adjusting assembly 340.

The first connecting member 320 is fixed on an end of the pivot shaft 310. The first connecting member 320 and the pivot shaft 310 are integrated a single piece, but the disclosure is not limited thereto. In other embodiments, the first connecting member 320 can be fixed to the pivot shaft 310 by a screw or a welding process. In addition, the first connecting member 320 is fixed on the support 200 by, for example, screwing.

The second connecting member 330 is pivoted on the pivot shaft 310, so the second connecting member 330 can be rotatable relative to the pivot shaft 310. In addition, the second connecting member 330 is fixed on the main body 100 by, for example, screwing.

The torque adjusting assembly 340 includes a first sleeve 341, a second sleeve 342, a third sleeve 343, a fourth sleeve 344 and an elastic member 345. The pivot shaft 310 is disposed through the first sleeve 341, the second sleeve 342, the third sleeve 343, the fourth sleeve 344 and the elastic member 345.

The first sleeve 341 is pivoted on the pivot shaft 310, and the first sleeve 341 includes plural first protrusions 341a. Each of the first protrusions 341a has a first slope 341b and a first blocking surface 341c which are located on two opposite sides of the first protrusion 341a. The normal N1 of the first blocking surface 341c is orthogonal to an axis A of the pivot shaft 310. Both the first slopes 341b on the first protrusions 341a face the second sleeve 342.

The second sleeve 342 is disposed on the pivot shaft 310 and slidable along the axis A of the pivot shaft 310. The second sleeve 342 and the pivot shaft 310 are jointly rotatable about the axis A; that is, the second sleeve 342 and the pivot shaft 310 are able to rotate together. The second sleeve 342 includes plural second protrusions 342a. Each of the second protrusions 342a has a second slope 342b and a second blocking surface 342c which are located on two opposite sides of the second protrusion 342a. The normal N2 of the second blocking surface 342c is orthogonal to the axis A of the pivot shaft 310. Both the second slopes 342b of the second protrusions 342a face the first sleeve 341.

The first sleeve 341 is rotatable relative to the second sleeve 342. The first sleeve 341 is slidable relative to the pivot shaft 310, and the first protrusion 341a is pressed against the second slope 342b of the second protrusion 342a. The first protrusion 341a can be either at an ascent state or a descent state according to its rotating direction. When the first protrusion 341a rotates at the ascent state, a distance parallel to the axis A of the pivot shaft 310 between a vertex of the first protrusion and a vertex of the second protrusion 342a is reduced such that the amount of deformation of the elastic member 345 is increased. When the first protrusion 341a rotates at the descent state, a distance parallel to the axis A of the pivot shaft 310 between the vertex of the first protrusion and the vertex of the second protrusion 342a is increased such that the amount of deformation of the elastic member 345 is decreased. In this embodiment, the first protrusion 341a slides up the second slope 342b of the second protrusion 342a when rotating at the ascent state, and the first protrusion 341a slides down the second slope 342b when rotating at the descent state.

Moreover, in this embodiment, the first protrusion 341a can fit into the recess between every two adjacent second protrusions 342a, but the disclosure is not limited thereto. In other embodiment, the second protrusion can have different shape from the first protrusion, so the first protrusion 341a cannot fit into the recess between the second protrusions.

The third sleeve 343 is pivoted on the pivot shaft 310, and the third sleeve 343 includes plural third protrusions 343a. Each of the third protrusions 343a has a third slope 343b and a fourth slope 343c opposite to each other. Both the third slope 343b and the fourth slope 343c face the fourth sleeve 344. In this embodiment, the first sleeve 341 and the third sleeve 343 are integrated into one piece, but the disclosure is not limited thereto. In other embodiments, the first sleeve 341 and third sleeve 343 can be two independent objects.

The fourth sleeve 344 is disposed on the pivot shaft 310 and slidable along the axis A of the pivot shaft 310. The fourth sleeve 344 and the pivot shaft 310 are jointly rotatable about the axis A; that is, the fourth sleeve 344 and the pivot shaft 310 are able to rotate together. The fourth sleeve 344 includes plural fourth protrusions 344a and has plural planar surfaces 344d. The fourth protrusions 344a and the planar surfaces 344d are staggered arranged. In detail, each of the fourth protrusions 344a has a fifth slope 344b and a sixth slope 344c opposite to each other, and both the fifth slope 344b and the sixth slope 344c face the third sleeve 343. The fifth slope 344b is connected to one of the planar surfaces 344d, and the sixth slope 344c is connected to another planar surface 344d opposite to the fifth slope 344b.

The quantities of the fourth protrusion 344a and the planar surface 344d are not limited to the disclosure. In other embodiments, both the quantities of the fourth protrusion 344a and the planar surface 344d can be one.

The third sleeve 343 is rotatable relative to the fourth sleeve 344. The third sleeve 343 is slidable relative to the pivot shaft 310, and the third protrusion 343a is selectively pressed against the fifth slope 344b, the sixth slope 344c and the planar surface 344d of the fourth protrusion 344a. The third protrusion 343a can be either at the ascent state or the descent state according to its rotating direction. The illustration for the ascent state and the descent state can be referred to the description in the above paragraphs, so it is not repeated hereafter. When the third protrusion 343a is pressed against the crest of the sixth slope 344c (a side of the sixth slope 344c close to the second sleeve 342; an intersection between the fifth slope 344b and the sixth slope 344c; or a vertex of the fourth protrusion 344a), there is a first predetermined angle between the main body 100 and the support 200. The first predetermined angle ranges, for example, from 10 degrees to 25 degrees. When the third protrusion 343a is pressed against the base of the fifth slope 344b (a side of the fifth slope 344b away from the second sleeve 342; or an intersection between the fifth slope 344b and the planar surface 344d), there is a second predetermined angle between the main body 100 and the support 200. The second predetermined angle ranges, for example, from 27 degrees to 35 degrees.

In this embodiment, the first predetermined angle is 15 degrees and the second predetermined angle is 30 degrees. When the angle between the main body 100 and the support 200 is reduced from 30 degrees to 15 degrees, both the first protrusion 341a and the third protrusion 343a are at the ascent state, and thereby improving the capability of the main body 100 for resisting the force pressing thereon. In addition, when the third protrusion 343a slides on the planar surface 344d along a direction away from the fifth slope 344b, the angle between the main body 100 and the support 200 is increased.

In this embodiment, the third protrusion 343a can fit into the recess between every two adjacent fourth protrusions 344a, but the disclosure is not limited thereto. In other embodiments, the fourth protrusion can have different shape from the third protrusion, so the third protrusion 343a cannot fit into the recess between the fourth protrusions.

In this embodiment, the inclination of the third slope 343b is less than the inclination of the fourth slope 343c, and the inclination of the fifth slope 344b is greater than the inclination of the sixth slope 344c, so the user can easily open the support 200. Furthermore, when the angle between the main body 100 and the support 200 is between the first predetermined angle (e.g. 15 degrees) and the second predetermined angle (e.g. 30 degrees), the pivoting mechanism 300 can provide relatively large resistance for resisting the support 200 and the main body 100 from rotating relative to each other.

In addition, the inclination of the slope mentioned above is defined by an angle between the slope and a reference surface, wherein the normal line of the reference surface is parallel to the axis A. The larger the angle between the slope and the reference surface is, the greater the inclination of the slope is.

The present disclosure is not limited to the inclinations of the third slope 343b and the fourth slope 343c. In other embodiments, the inclination of the third slope 343b can be larger than or equal to the inclination of the fourth slope 343c, and the inclination of the fifth slope 344b can be less than or equal to the inclination of the sixth slope 344c.

In this embodiment, the first sleeve 341 and the third sleeve 343 are disposed between the second sleeve 342 and the fourth sleeve 344, but the present disclosure is not limited thereto. In other embodiments, the second sleeve 342 and the fourth sleeve 344 can be disposed between the first sleeve 341 and the third sleeve 343.

The elastic member 345 is, for example, a compression spring disposed on a side of the second sleeve 342 away from the first sleeve 341. The elastic member 345 deforms so as to adjust the torque provided by the torque adjusting assembly 340.

The torque adjusting assembly 340 can further include a connecting shaft 346 and a torsion member 347. The connecting shaft 346 is disposed through the second connecting member 330, the first sleeve 341 and the third sleeve 343 such that the first sleeve 341, the third sleeve 343 and the second connecting member 330 are jointly rotatable about the connecting shaft 346. The torsion member 347 is, for example, made from a sheet material which can be twisted. The pivot shaft 310 and the connecting shaft 346 are respectively disposed on two sides of the torsion member 347.

The torque adjusting assembly 340 can further include a flange 348 and a fixing member 349. The flange 348 is located on an end of the pivot shaft 310 close to the first connecting member 320. The fixing member 349 is detachably fixed to an end of the pivot shaft 310 away from the first connecting member 320. The second connecting member 330, the first sleeve 341, the second sleeve 342, the third sleeve 343, the fourth sleeve 344 and the elastic member 345 are clamped between the flange 348 and the fixing member 349.

Figure 6:
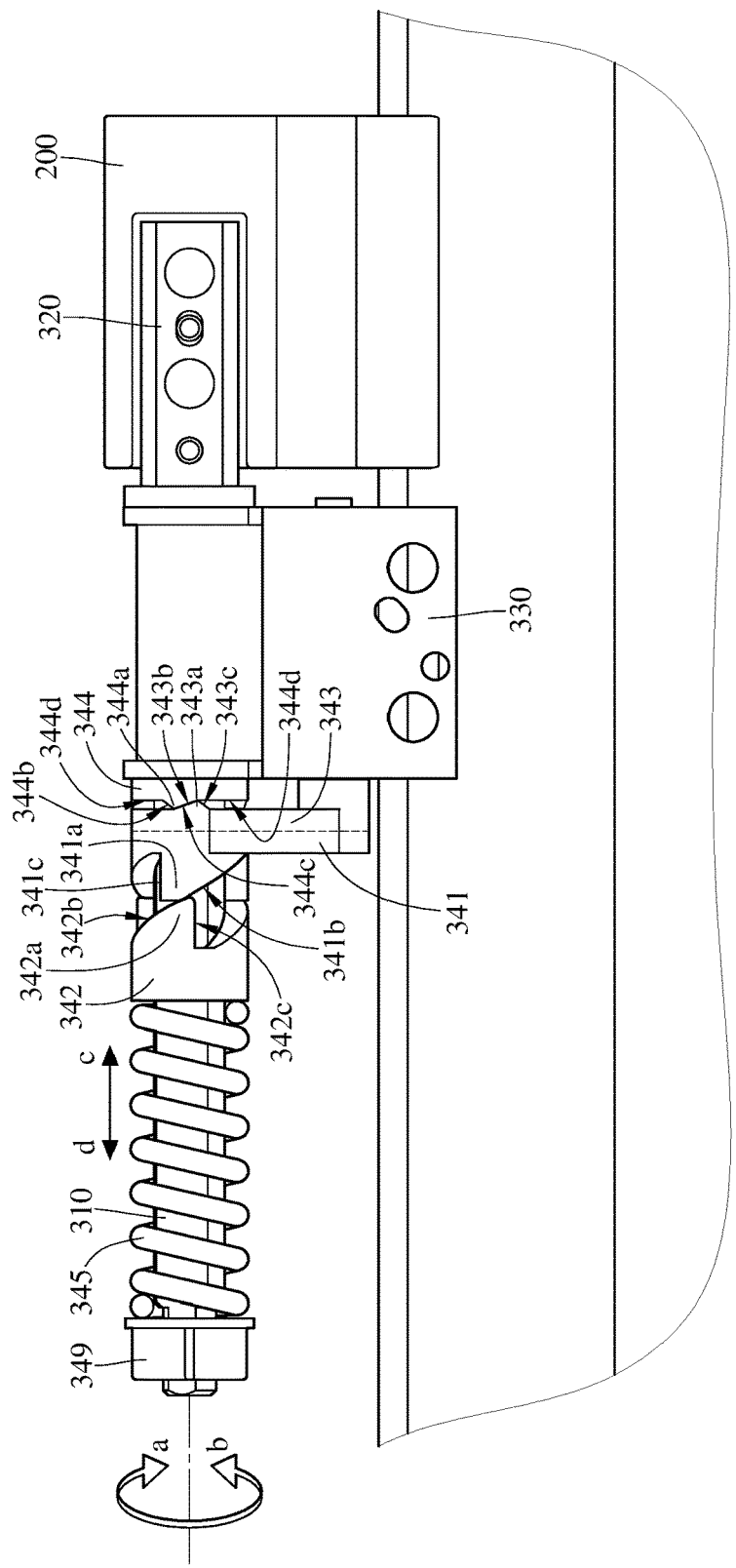
FIG. 6 and FIG. 7 are respectively side views of the pivoting mechanism and the portable electronic device according to the first embodiment when the portable electronic device is idle.
Figure 7:
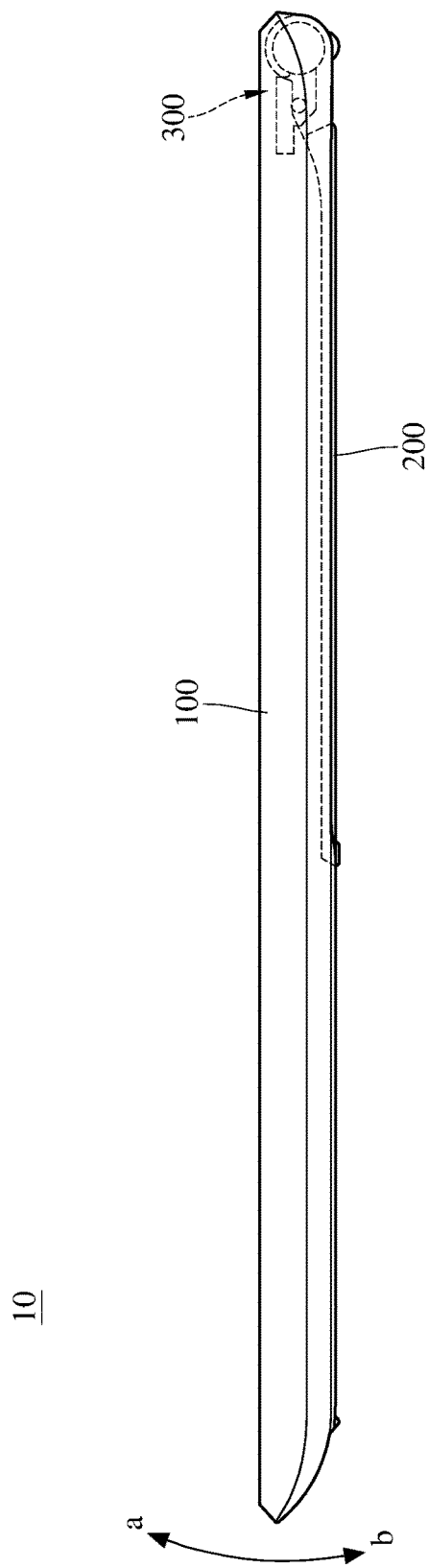
Figure 8:
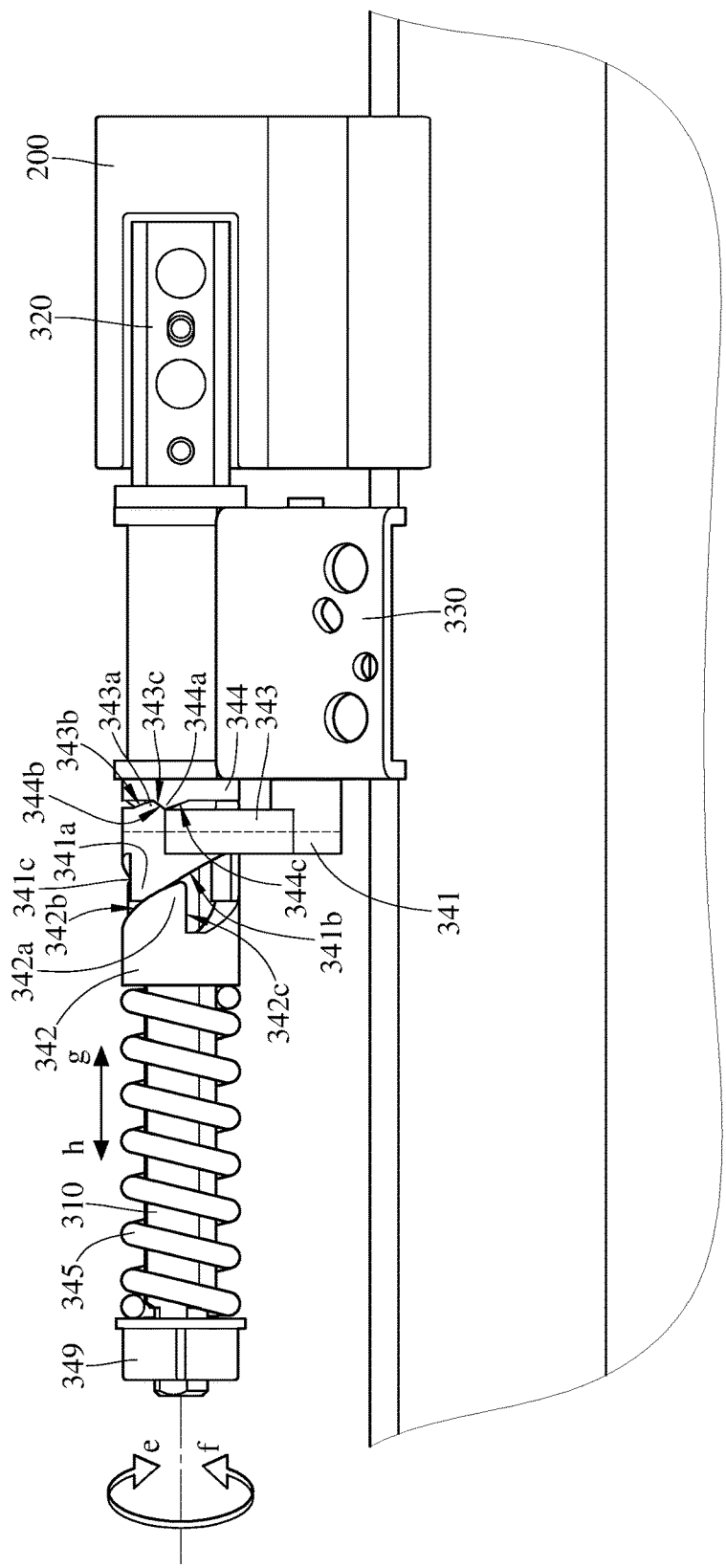
FIG. 8 and FIG. 9 are respectively side views of the pivoting mechanism and the portable electronic device according to the first embodiment when the portable electronic device is in use with a first predetermined angle.
Figure 9:
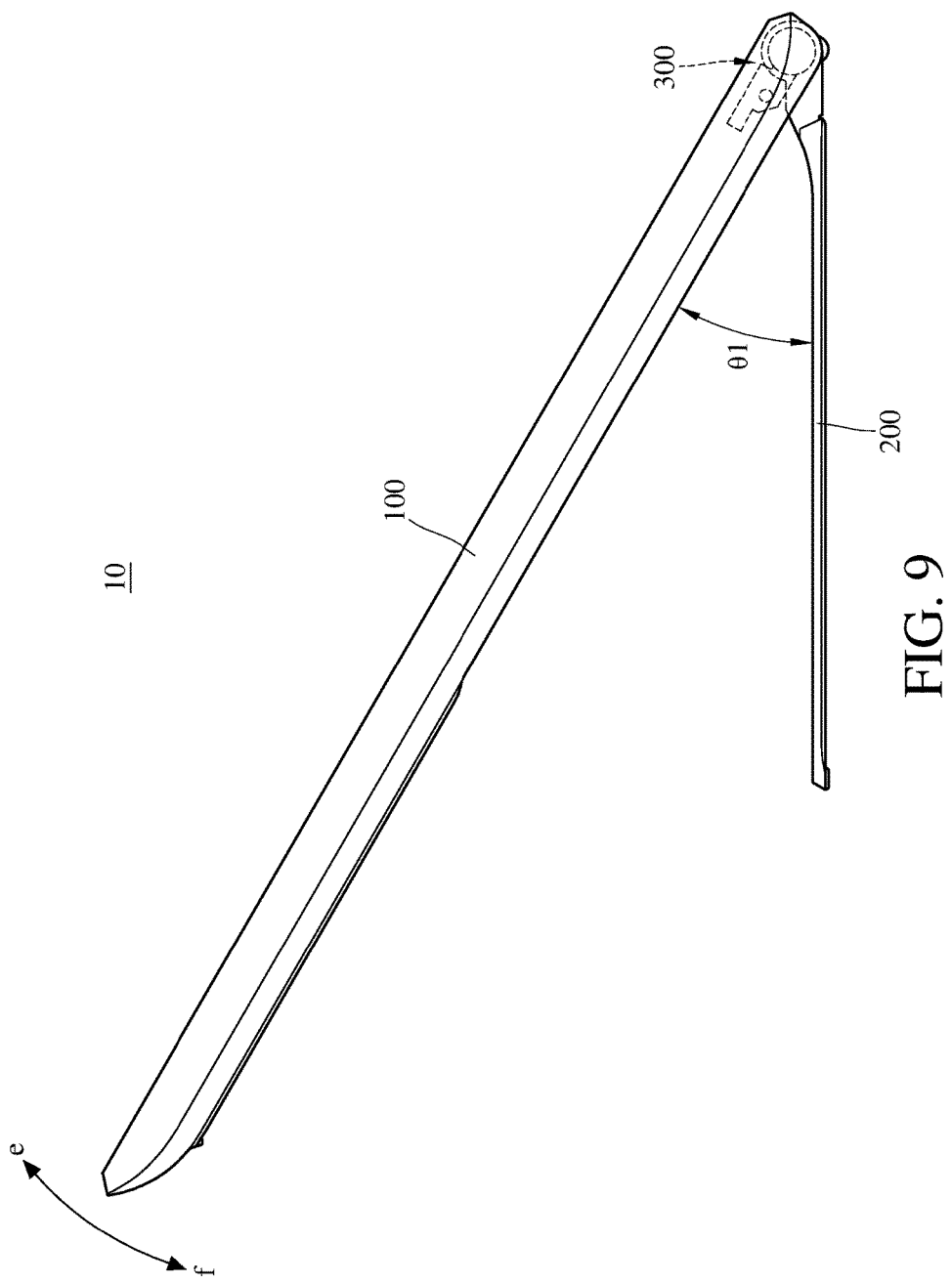
Figure 10:
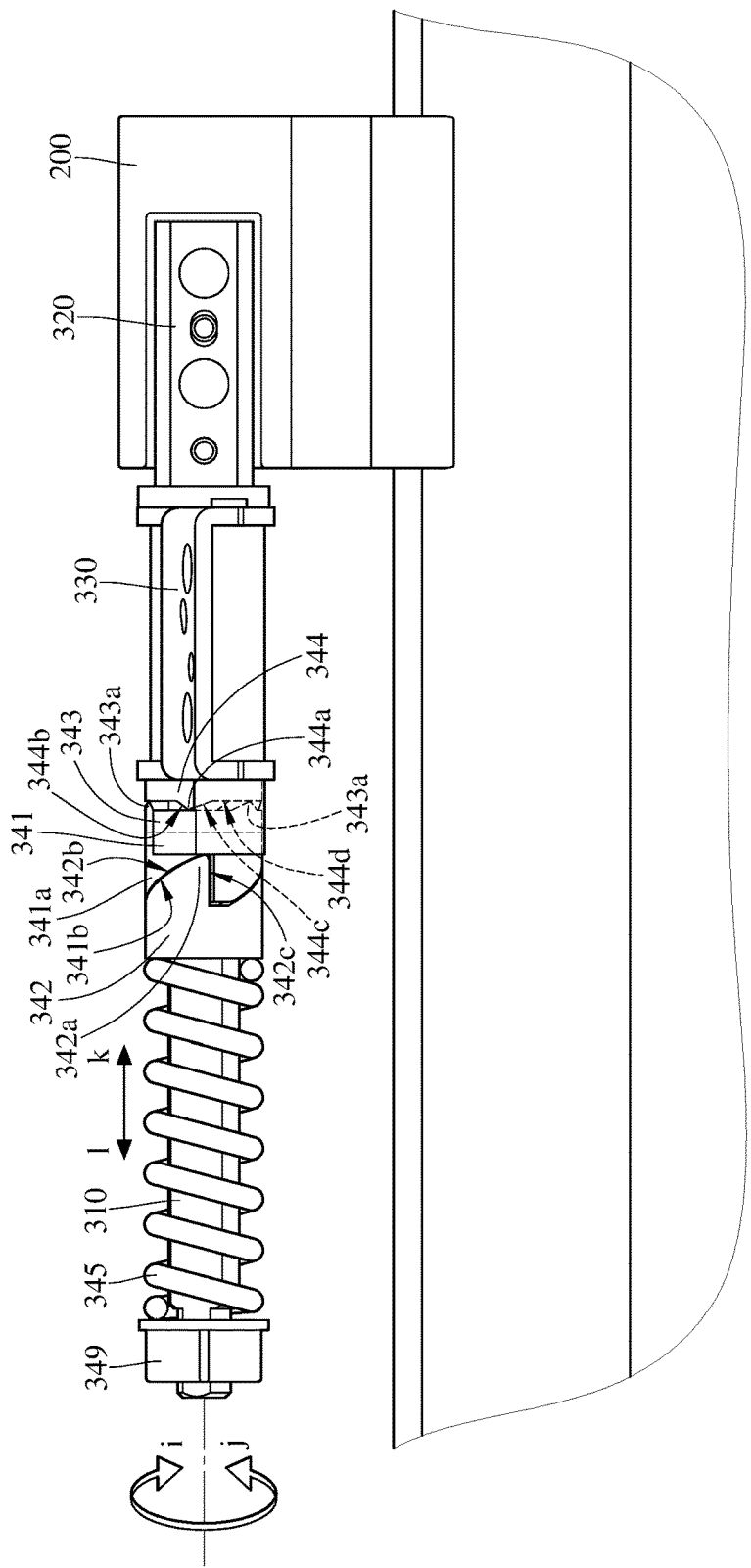
FIG. 10 and FIG. 11 are respectively side views of the pivoting mechanism and the portable electronic device according to the first embodiment when the portable electronic device is in use with a second predetermined angle.
Figure 11:
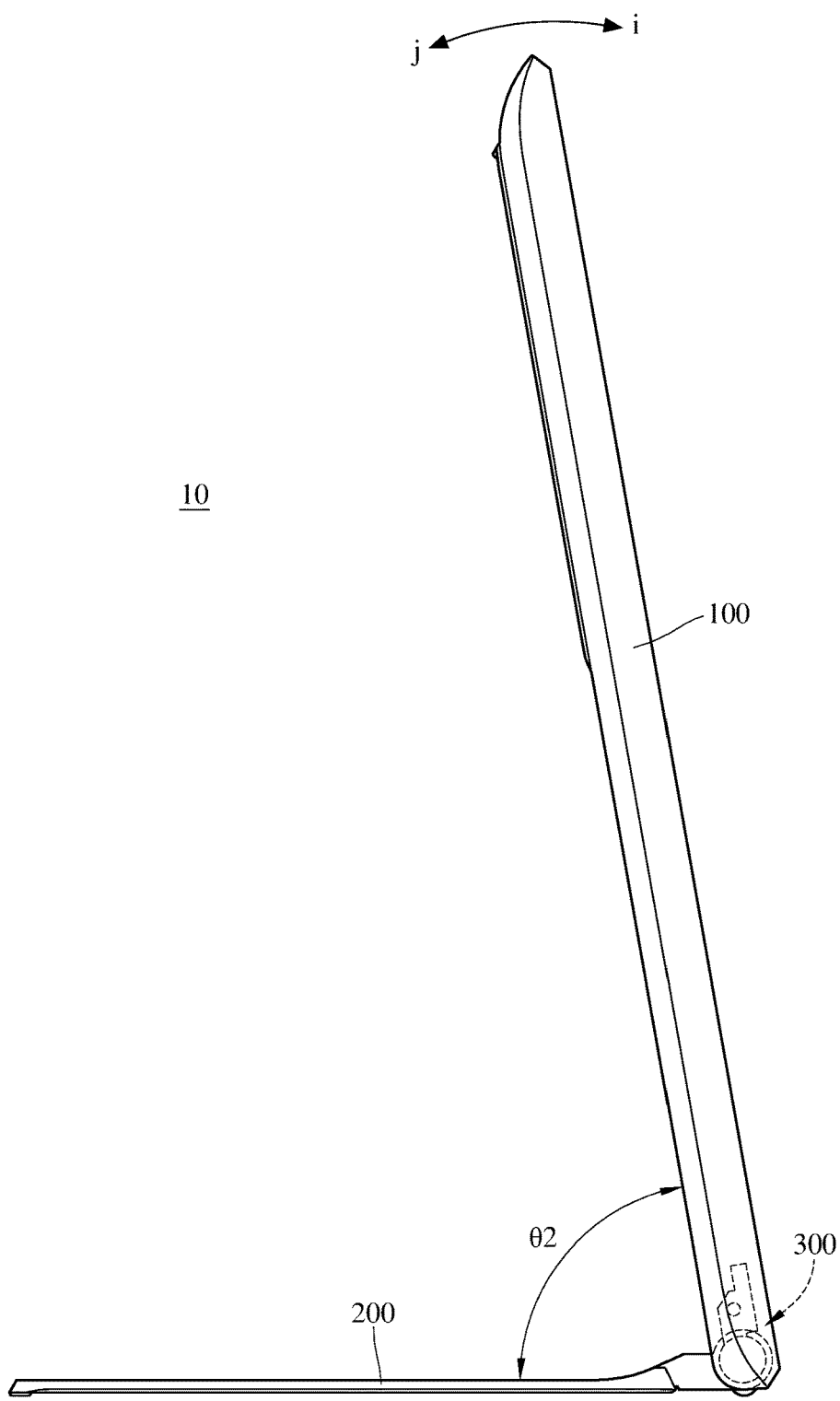

Please refer to FIG. 6 to FIG. 11. FIG. 6 and FIG. 7 are respectively side views of the pivoting mechanism and the portable electronic device according to the first embodiment when the portable electronic device is idle. FIG. 8 and FIG. 9 are respectively side views of the pivoting mechanism and the portable electronic device according to the first embodiment when the portable electronic device is in use with a first predetermined angle. FIG. 10 and FIG. 11 are respectively side views of the pivoting mechanism and the portable electronic device according to the first embodiment when the portable electronic device is in use with a second predetermined angle.

As shown in FIG. 6 and FIG. 7, when the support 200 is closed (i.e. the angle between the main body 100 and the support 200 is 0 degree), the first protrusion 341a is pressed against the second slope 342b of the second protrusion 342a, and the third protrusion 343a is pressed against the sixth slope 344c of the fourth protrusion 344a. While the main body 100 is rotated relative to the support 200 from 0 degree to the first predetermined angle (15 degrees), the first protrusion 341a is pressed against and slides down the second slope 342b and at the descent state, the third protrusion 343a is pressed against and slides up the sixth slope 344c and at the ascent state; thereby, the deformation of the elastic member 345 is increased when the main body 100 is rotated. When the angle between the main body 100 and the support 200 is smaller than 15 degrees and there is no external force applied on the portable electronic device 10, the elastic member 345 releases and would take the third protrusion 343a back to the base of the sixth slope 344c, thereby driving the main body 100 to rotate along the direction b to automatically lie back on the support 200.

Furthermore, by the interaction among the first protrusion 341a, the second protrusion 342a, the third protrusion 343a and the fourth protrusion 344a, the first sleeve 341, the second sleeve 342 and the third sleeve 343 can slide in the direction c or the direction d. In addition, by elastic member 345, the first sleeve 341 and the second sleeve 342 can be firmly pressed against each other as well as the third sleeve 343 and the fourth sleeve 344.

In this embodiment, the inclinations of the fifth slope 344b and the sixth slope 344c on the fourth protrusion 344a are substantially symmetrical (that is, the gradients of the fifth slope 344b and the sixth slope 344c have the same value but different signs), but the disclosure is not limited thereto. In other embodiments, the gradients of the fifth slope 344b and the sixth slope 344c can have different values but the same sign, or can have different values and different signs.

As shown in FIG. 8 and FIG. 9, when the main body 100 is rotated along the direction e and the angle between the main body 100 and the support 200 increases, the third protrusion 343a slides up the sixth slope 344c and passes across the crest of the sixth slope 344c (the vertex of the fourth protrusion 344a). In detail, when the angle θ1 between the main body 100 and the support 200 is larger than the first predetermined angle (15 degrees), the third protrusion 343a slides on the fifth slope 344b, and thereby both the first protrusion 341a and the third protrusion 343a are at the descent state. The elastic member 345 releases, so the third protrusion 343a slides down the fifth slope 344b to the base of the fifth slope 344b (a side of the fifth slope 344b away from the sixth slope 344c); thereby, the angle θ1 between the main body 100 and the support 200 is automatically increased from the first predetermined angle (15 degrees) to the second predetermined angle (30 degrees).

When the main body 100 is rotated from the second predetermined angle (30 degrees) to the first predetermined angle (15 degrees) along the direction f, the third protrusion 343a sliding up the fifth slope 344b of the fourth protrusion 344a and the first protrusion 341a sliding up the second slope 342b of the second protrusion 342a both at the ascent state, so the deformation of elastic member 345 and the friction between the elastic member 345 and the pivot shaft 310 are increased. Therefore, the elastic member 345 stores enough elastic energy to keep the position of the main body 100 relative to the support 200 when the angle θ1 is between the 15 degrees and 30 degrees. That is, by the configurations of the first sleeve 341, the second sleeve 342, the third sleeve 343 and the fourth sleeve 344, there is a relatively large resistance for resisting the main body 100 and the support 200 to rotate relative to each other while the angle θ1 is between the first predetermined angle and the second predetermined angle. Accordingly, when the user presses harder on the main body 100, the torque adjusting assembly 340 can provide enough resistance to maintain the inclination of the main body 100. According to the illustration mentioned above, when the third protrusion 343a slides on the fifth slope 344b, it is favorable for firmly positioning the main body 100 at a proper inclination in relation to the support 200 for the user to use the portable electronic device 10 comfortably. When the third protrusion 343a slides on the sixth slope 344c, the main body 100 can automatically rotate to lie back on the support 200.

Moreover, the interaction among the first protrusion 341a, the second protrusion 342a, the third protrusion 343a and the fourth protrusion 344a, the first sleeve 341, the second sleeve 342 and the third sleeve 343 can slide along the direction g or the direction h. The elastic member 345 can force the first sleeve 341 and the second sleeve 342 to firmly press against each other as well as the third sleeve 343 and the fourth sleeve 344 to firmly press against each other.

As shown in FIG. 10 and FIG. 11, when the main body 100 is rotated along the direction i to be much more steep relative to the support 200, the third protrusion 343a slides down the fifth slope 344b to pass across the base of the fifth slope 344b.

In detail, when the angle between the main body 100 and the support 200 is larger than the second predetermined angle (30 degrees), the third protrusion 343a slides on the planar surface 344d, and thereby the first protrusion 341a is at the descent state while the third protrusion 343a is not at the ascent state or the descent state. The elastic member 345 releases and drives the first protrusion 341a to slide down the second slope 342b; thereby, the angle θ1 between the main body 100 and the support 200 automatically increases until the first blocking surface 341c of the first protrusion 341a is pressed against the second blocking surface 342c of the second protrusion 342a. In such a case, the main body 100 has the greatest inclination relative to the support 200 (for example, the angle θ2 between the main body 100 and the support 200 is 80 degrees) when the first blocking surface 341c is pressed against the second blocking surface 342c.

When the main body 100 is rotated from its greatest inclined position along the direction j, since the first protrusion 341a is at the ascent state relative to the second slope 342b, the main body 100 is stably positioned with the angle θ2 between the second predetermined angle (30 degrees) and the largest angle (80 degrees).

Moreover, the interaction among the first protrusion 341a, the second protrusion 342a, the third protrusion 343a and the fourth protrusion 344a, the first sleeve 341, the second sleeve 342 and the third sleeve 343 can slide along the direction k or the direction l. The elastic member 345 can force the first sleeve 341 and the second sleeve 342 to firmly press against each other as well as the third sleeve 343 and the fourth sleeve 344 to firmly press against each other.

Figure 12:
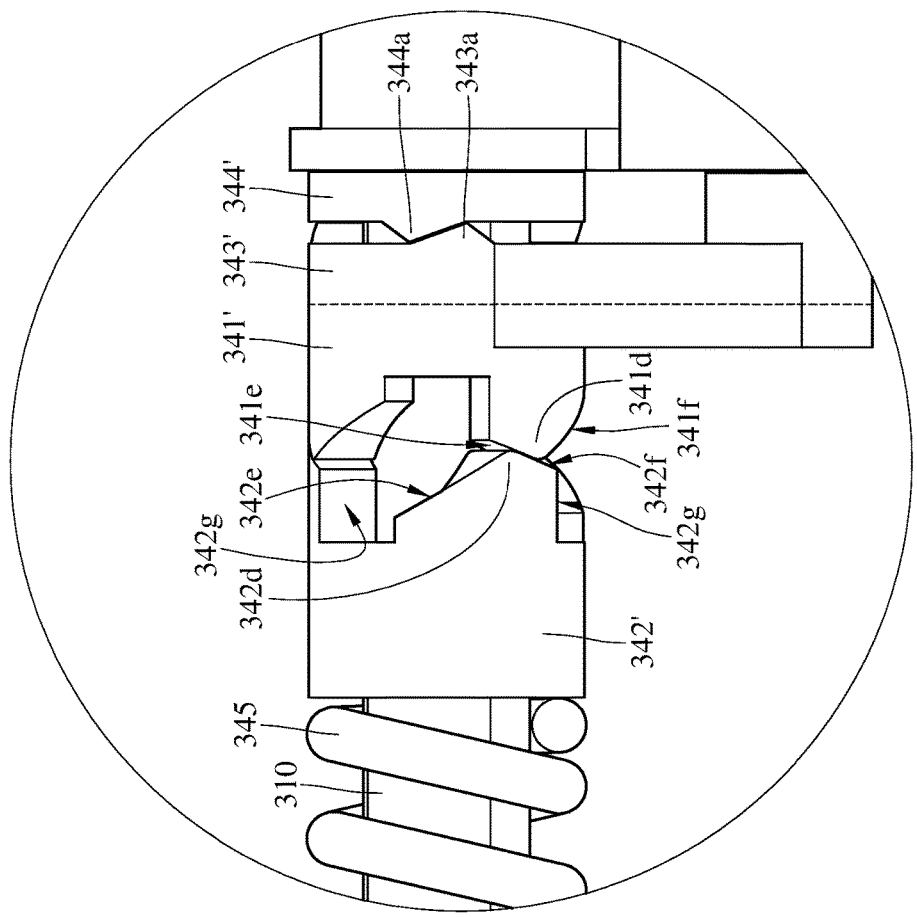
FIG. 12 is a partially enlarged view of a pivoting mechanism according to a second embodiment.

The disclosure is not limited to the shapes of the first sleeve 341 and the second sleeve 342. Please refer to FIG. 12. FIG. 12 is a partial enlarged view of a pivoting mechanism according to a second embodiment. Since the second embodiment is similar to the first embodiment, only the differences will be illustrated hereafter.

In this embodiment, the torque adjusting assembly includes a first sleeve 341' including plural first protrusions 341d. Each of the first protrusions 341d has a first slope 341e and a second slope 341f opposite to each other. The first slope 341e and the second slope 341f are respectively located on two opposite sides of the first protrusion 341d. Both the first slope 341e and the second slope 341f face a second sleeve 342'. The second sleeve 342' includes plural second protrusions 342d. Each of the second protrusions 342d has a third slope 342e and a fourth slope 342f opposite to each other. The third slope 342e and the fourth slope 342f are located on two opposite sides of the second protrusion 342d. Both the third slope 342e and the fourth slope 342f face the first sleeve 341'.

Furthermore, each of the second protrusions 342d further has a blocking surface 342g connected to the fourth slope 342f. The normal line of the blocking surface 342g is in orthogonal to the axis of the pivot shaft 310.

The interaction between the third sleeve 343' and the fourth sleeve 344' is similar to that between the third sleeve 343 and the fourth sleeve 344 in the first embodiment, so the illustration is omitted.

According to the disclosure, the rotations of the sleeves and the interactions among the protrusions are able to adjust the amount of deformation of the elastic member when the main body is rotated relative to the support, thereby adjusting the torque provided by the pivot mechanism. Thus, the support can be automatically closed when it is arranged with a specific angle relative to the main body. In addition, the pivot mechanism can provide a relatively larger torque when the support is arranged with another specific angle relative to the main body, so the pivot mechanism can provide relatively large resistance for resisting the support and the main body from rotating relative to each other for maintaining the inclination of the main body. Accordingly, when the user presses harder on the main body, the main body is prevented from being rotated.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use being contemplated. The embodiments depicted above and the appended drawings are exemplary and are not intended to be exhaustive or to limit the scope of the disclosure to the precise forms disclosed. Modifications and variations are possible in view of the above teachings.

What is claimed is:
1. A pivoting mechanism for an electronic device comprising a main body and a support, the pivoting mechanism comprising:
   a pivot shaft;
   a first connecting member disposed on the pivot shaft for being connected with the support;
   a second connecting member disposed on the pivot shaft for being connected with the main body; and
   a torque adjusting assembly comprising a first sleeve, a second sleeve, a third sleeve, a fourth sleeve and an elastic member, the pivot shaft is disposed through the first sleeve, the second sleeve, the third sleeve, the fourth sleeve and the elastic member, the first sleeve comprising at least one first protrusion, the second sleeve comprising at least one second protrusion, the third sleeve comprising at least one third protrusion, the fourth sleeve comprising at least one fourth protrusion, wherein the at least one first protrusion is slidable relative to the at least one second protrusion and the at least one third protrusion is slidable relative to the at least one fourth protrusion;
   wherein the at least one first protrusion, the at least one second protrusion, the at least one third protrusion and the at least one fourth protrusion are jointly rotatable for adjusting an amount of deformation of the elastic member,
  wherein the at least one first protrusion has a first blocking surface and a first slope respectively located on two sides of the at least one first protrusion opposite to each other, a normal line of the first blocking surface is substantially orthogonal to an axis of the pivot shaft, and the first slope faces the second sleeve; the at least one second protrusion has a second blocking surface and a second slope respectively located on two sides of the at least one second protrusion opposite to each other, a normal line of the second blocking surface is substantially orthogonal to the axis of the pivot shaft, the second slope faces the first sleeve, and the second slope is pressed against the first slope.

2. The pivoting mechanism according to claim 1, wherein the first sleeve, the second sleeve, the third sleeve and the fourth sleeve reduce the amount of deformation of the elastic member when an angle between the main body and the support is increased, and the first sleeve, the second sleeve, the third sleeve and the fourth sleeve increase the amount of deformation of the elastic member when the angle between the main body and the support is reduced.

3. The pivoting mechanism according to claim 1, wherein the at least one third protrusion has a third slope and a fourth slope opposite to each other, both the third slope and the fourth slope face the fourth sleeve, the at least one fourth protrusion has a fifth slope and a sixth slope opposite to each other, and both the fifth slope and the sixth slope face the third sleeve;
  wherein the at least one third protrusion is pressed against an intersection of the fifth slope and the sixth slope when the main body and the support are arranged with a first predetermined angle therebetween, the at least one third protrusion is pressed against the sixth slope when an angle between the main body and the support is smaller than the first predetermined angle, and the at least one third protrusion is pressed against the fifth slope when the angle between the main body and the support is larger than the first predetermined angle.

4. The pivoting mechanism according to claim 3, wherein there is a second predetermined angle larger than the first predetermined angle, the fourth sleeve has a planar surface, a normal line of the planar surface is substantially parallel to the axis of the pivot shaft, and the fifth slope is connected with the sixth slope and the planar surface;
  wherein the at least one third protrusion is pressed against an intersection of the fifth slope and the planar surface when the main body and the support are arranged with the second predetermined angle therebetween, the at least one third protrusion is pressed against the fifth slope when an angle between the main body and the support is smaller than the second predetermined angle, and the at least one third protrusion is pressed against the planar surface when the angle between the main body and the support is larger than the second predetermined angle.

5. The pivoting mechanism according to claim 3, wherein an inclination of the third slope of the at least one third protrusion is different from an inclination of the fourth slope of the at least one third protrusion.

6. The pivoting mechanism according to claim 5, wherein an inclination of the fifth slope of the at least one fourth protrusion is different from an inclination of the sixth slope of the at least one fourth protrusion.

7. The pivoting mechanism according to claim 1, wherein the first predetermined angle ranges from 10 degrees to 25 degrees.

8. The pivoting mechanism according to claim 1, wherein the second sleeve, the fourth sleeve and the pivot shaft are jointly rotatable, the first sleeve and the third sleeve is pivoted on the pivot shaft, and both the second sleeve and the fourth sleeve are slidable relative to the pivot shaft.

9. The pivoting mechanism according to claim 1, wherein both the first sleeve and the third sleeve are disposed between the second sleeve and the fourth sleeve, and the first sleeve is integral with the third sleeve.

10. The pivoting mechanism according to claim 1, wherein the torque adjusting assembly further comprises a connecting shaft disposed through the second connecting member, the first sleeve and the third sleeve for the second connecting member, the first sleeve and the third sleeve to be jointly rotatable.

11. The pivoting mechanism according to claim 10, wherein the torque adjusting assembly further comprises a torsion member, the pivot shaft and the connecting shaft are respectively disposed on two sides of the torsion member.

12. A pivoting mechanism for an electronic device comprising a main body and a support, the pivoting mechanism comprising:
  a pivot shaft
  a first connecting member disposed on the pivot shaft for being connected with the support;
  a second connecting member disposed on the pivot shaft for being connected with the main body; and
  a torque adjusting assembly comprising a first sleeve, a second sleeve, a third sleeve, a fourth sleeve and an elastic member, the pivot shaft is disposed through the first sleeve, the second sleeve, the third sleeve, the fourth sleeve and the elastic member, the first sleeve comprising at least one first protrusion, the second sleeve comprising at least one second protrusion, the third sleeve comprising at least one third protrusion, the fourth sleeve comprising at least one fourth protrusion, wherein the at least one first protrusion is slidable relative to the at least one second protrusion and the at least one third protrusion is slidable relative to the at least one fourth protrusion;
  wherein the at least one first protrusion, the at least one second protrusion, the at least one third protrusion and the at least one fourth protrusion are jointly rotatable for adjusting an amount of deformation of the elastic member;
    wherein the at least one first protrusion has a first slope and a second slope respectively located on two sides of the at least one first protrusion opposite to each other, the first slope and the second slope are opposite to each other, and both the first slope and the second slope face the second sleeve; the at least one second protrusion has a third slope and a fourth slope respectively located on two sides of the at least one second protrusion opposite to each other, the third slope and the fourth slope are opposite to each other, and both the third slope and the fourth slope face the first sleeve; and
    wherein the at least one second protrusion further has a blocking surface connected to the fourth slope, and a normal line of the blocking surface of the at least one second protrusion is substantially orthogonal to an axis of the pivot shaft.

13. The pivoting mechanism according to claim 1, wherein the first sleeve is rotatable relative to the second sleeve, and the third sleeve is rotatable relative to the fourth sleeve.

14. A portable electronic device, comprising:
- a main body;
- a support; and
- at least one pivoting mechanism connecting the main body with the support for the main body and the support to be rotatable relative to each other, the at least one pivoting mechanism comprising:
  - a pivot shaft;
  - a first connecting member disposed on the pivot shaft, and the first connecting member connected with the support;
  - a second connecting member disposed on the pivot shaft, and the second connecting member connected with the main body; and
- a torque adjusting assembly comprising a first sleeve, a second sleeve, a third sleeve, a fourth sleeve and an elastic member, the pivot shaft is disposed through the first sleeve, the second sleeve, the third sleeve, the fourth sleeve and the elastic member, the first sleeve comprising at least one first protrusion, the second sleeve comprising at least one second protrusion, the third sleeve comprising at least one third protrusion, the fourth sleeve comprising at least one fourth protrusion, wherein the at least one first protrusion is slidable relative to the at least one second protrusion and the at least one third protrusion is slidable relative to the at least one fourth protrusion, wherein the at least one first protrusion, the at least one second protrusion, the at least one third protrusion and the at least one fourth protrusion are jointly rotatable for adjusting an amount of deformation of the elastic member, wherein the at least one first protrusion has a first blocking surface and a first slope respectively located on two sides of the at least one first protrusion opposite to each other, a normal line of the first blocking surface is substantially orthogonal to an axis of the pivot shaft, and the first slope faces the second sleeve; the at least one second protrusion has a second blocking surface and a second slope respectively located on two sides of the at least one second protrusion opposite to each other, a normal line of the second blocking surface is substantially orthogonal to the axis of the pivot shaft, the second slope faces the first sleeve, and the second slope is pressed against the first slope.

15. The portable electronic device according to claim 14, wherein the first sleeve, the second sleeve, the third sleeve and the fourth sleeve reduce the amount of deformation of the elastic member when an angle between the main body and the support is increased, and the first sleeve, the second sleeve, the third sleeve and the fourth sleeve increase the amount of deformation of the elastic member when the angle between the main body and the support is reduced.

16. The portable electronic device according to claim 14, wherein the first sleeve is rotatable relative to the second sleeve, and the third sleeve is rotatable relative to the fourth sleeve.

* * * * *